(12) United States Patent
Warner (10) Patent No.: US 8,574,045 B2
(45) Date of Patent: Nov. 5, 2013

(54) FROST-FREE VENT ASSEMBLY

(76) Inventor: Dina Warner, Broomfield, CO (US)

( * ) Notice: Subject to any disclaimer, the term of this patent is extended or adjusted under 35 U.S.C. 154(b) by 333 days.

(21) Appl. No.: 12/971,752

(22) Filed: Dec. 17, 2010

(65) Prior Publication Data

US 2012/0152393 A1 Jun. 21, 2012

(51) Int. Cl.
*F23J 13/08* (2006.01)
*F23L 17/02* (2006.01)

(52) U.S. Cl.
USPC ............... 454/3; 454/4; 454/358; 454/366; 251/345; 138/32

(58) Field of Classification Search
USPC ............ 454/3, 4, 358, 366; 138/32; 251/345
See application file for complete search history.

(56) References Cited

U.S. PATENT DOCUMENTS

| | | | | |
|---|---|---|---|---|
| 500,628 A | * | 7/1893 | Stuart | 454/27 |
| 941,900 A | * | 11/1909 | Wood | 126/312 |
| 1,622,431 A | * | 3/1927 | Feigenbaum | 110/235 |
| 1,739,138 A | * | 12/1929 | Giragosian | 126/344 |
| 1,864,555 A | * | 6/1932 | Rostek | 454/250 |
| 1,967,504 A | * | 7/1934 | Gaughran, Jr. et al. | 454/133 |
| 2,014,314 A | * | 9/1935 | Defenbaugh | 251/122 |
| 2,251,511 A | * | 8/1941 | Burke | 454/131 |
| 2,494,679 A | * | 1/1950 | Ward, Jr. | 220/372 |
| 2,531,139 A | * | 11/1950 | Lilly et al. | 126/85 B |
| 2,567,323 A | * | 9/1951 | Cyphert | 126/96 |
| 2,628,549 A | * | 2/1953 | Stelmach | 454/128 |
| 2,629,456 A | | 2/1953 | Dick | |
| 2,718,840 A | * | 9/1955 | Lyman | 454/256 |
| 2,823,599 A | * | 2/1958 | Still | 454/22 |
| 2,925,991 A | * | 2/1960 | Hempel | 251/145 |
| 2,980,392 A | * | 4/1961 | Greenwood | 251/210 |
| 3,052,230 A | * | 9/1962 | Conrad | 126/307 R |
| 3,093,056 A | | 6/1963 | Rosenfeld | |
| 3,125,122 A | * | 3/1964 | Bermingham | 137/625.3 |
| 3,469,591 A | * | 9/1969 | Odendahl | 137/14 |
| 3,525,363 A | * | 8/1970 | Gore et al. | 137/625.47 |
| 3,561,487 A | * | 2/1971 | Reed, Jr. | 137/625.32 |
| 3,593,478 A | * | 7/1971 | Mason | 52/252 |
| 3,610,524 A | | 10/1971 | Wallen | |
| 3,783,900 A | * | 1/1974 | Waldbillig | 137/625.47 |
| 4,106,290 A | * | 8/1978 | Johnson | 60/324 |
| 4,353,349 A | * | 10/1982 | Bormida, Jr. | 126/112 |
| 4,370,919 A | * | 2/1983 | Wagner et al. | 454/367 |
| 4,442,643 A | | 4/1984 | Stadheim | |
| 4,514,951 A | * | 5/1985 | Eder | 52/660 |
| 4,522,191 A | * | 6/1985 | Knowles et al. | 126/307 R |
| 4,538,508 A | * | 9/1985 | Ballard | 454/361 |
| 4,541,544 A | | 9/1985 | Martin, Jr. | |
| 4,593,504 A | * | 6/1986 | Bonnici et al. | 52/199 |

(Continued)

*Primary Examiner* — Steven B McAllister
*Assistant Examiner* — Jonathan Cotov
(74) *Attorney, Agent, or Firm* — Booth Udall Fuller, PLC (57) ABSTRACT

A rotatable vent assembly system for areas where breathable airflow is required is disclosed herein. The rotatable vent assembly system improves airflow in any structure where breathable airflow may be a concern, including but not limited to air vacuum vaults, valve vaults, water tanks, pressure reducing valve units, or other confined structures. The rotatable vent assembly system helps reduce frost accumulation within riser pipes during winter months and improves breathable air within confined spaces. By reducing the accumulation of frost, the potential for pipe breakage is reduced, also reducing maintenance and replacement costs to municipalities and property owners for burst pipes. Rotating the vent control component at the top of a riser pipe connected to a pipe system controls the flow of breathable air by increasing or reducing airflow within the pipe system.

18 Claims, 4 Drawing Sheets

(56) References Cited

U.S. PATENT DOCUMENTS

| | | | |
|---|---|---|---|
| 4,627,411 A * | 12/1986 | Mertler | 126/39 E |
| 4,650,367 A * | 3/1987 | Dietzler | 405/43 |
| 4,759,270 A * | 7/1988 | Lindeen | 454/94 |
| 4,793,589 A * | 12/1988 | Eldredge et al. | 251/30.03 |
| 4,893,608 A * | 1/1990 | Reaser | 126/85 B |
| 4,982,653 A | 1/1991 | Gordon et al. | |
| 5,129,387 A * | 7/1992 | Behrens | 126/570 |
| 5,133,334 A * | 7/1992 | Riehl | 126/39 R |
| 5,162,018 A * | 11/1992 | Horton | 454/76 |
| 5,163,476 A * | 11/1992 | Wessman | 137/625.3 |
| 5,180,331 A * | 1/1993 | Daw et al. | 454/187 |
| 5,348,224 A * | 9/1994 | Consadori et al. | 236/20 R |
| 5,431,815 A * | 7/1995 | Te-Shin | 210/459 |
| 5,816,288 A | 10/1998 | Zelch | |
| 5,934,993 A * | 8/1999 | Maruyama | 454/250 |
| 5,960,595 A * | 10/1999 | McCorsley et al. | 52/199 |
| 5,979,505 A * | 11/1999 | Drechsel | 138/32 |
| 6,029,650 A * | 2/2000 | Treants | 126/204 |
| 6,168,514 B1 | 1/2001 | Weston | |
| 6,293,514 B1 * | 9/2001 | Pechoux et al. | 251/122 |
| 6,308,472 B1 * | 10/2001 | Coulton et al. | 52/198 |
| 6,374,425 B2 | 4/2002 | Downey | |
| 6,464,579 B1 | 10/2002 | Salazar | |
| 6,513,550 B1 * | 2/2003 | Kwilosz | 138/96 R |
| 6,735,790 B1 | 5/2004 | Willson et al. | |
| 6,800,024 B1 * | 10/2004 | Prevost | 454/290 |
| 6,807,984 B2 * | 10/2004 | Volovets et al. | 137/625.3 |
| 6,843,274 B1 | 1/2005 | Angelico | |
| 7,152,845 B2 * | 12/2006 | Carrez et al. | 251/297 |
| 7,267,322 B1 * | 9/2007 | Luby | 251/149.5 |
| 7,300,577 B1 | 11/2007 | Branz | |
| 7,484,533 B1 * | 2/2009 | Arndt | 138/96 R |
| 7,503,625 B2 * | 3/2009 | Bargheer et al. | 297/180.14 |
| 8,083,574 B2 * | 12/2011 | Arnold et al. | 454/4 |
| 8,246,430 B1 * | 8/2012 | Paynton et al. | 454/4 |
| 2001/0032352 A1 * | 10/2001 | Downey | 4/218 |
| 2002/0195097 A1 * | 12/2002 | Lesage | 126/85 B |
| 2003/0104779 A1 * | 6/2003 | Marts et al. | 454/368 |
| 2003/0139133 A1 * | 7/2003 | Hardy | 454/290 |
| 2005/0022878 A1 * | 2/2005 | Erinakes | 137/587 |
| 2005/0197055 A1 * | 9/2005 | Jensen | 454/12 |
| 2006/0057950 A1 | 3/2006 | Heise | |
| 2006/0211356 A1 * | 9/2006 | Grassman | 454/4 |
| 2006/0246835 A1 * | 11/2006 | Rimmer et al. | 454/290 |
| 2007/0033719 A1 | 2/2007 | McIntire | |
| 2007/0040136 A1 * | 2/2007 | Caprera | 251/122 |
| 2007/0042704 A1 * | 2/2007 | Qualy et al. | 454/250 |
| 2007/0167130 A1 * | 7/2007 | Brochu | 454/365 |
| 2007/0202790 A1 * | 8/2007 | Burns et al. | 454/4 |
| 2008/0160903 A1 * | 7/2008 | Fontana | 454/289 |
| 2008/0207105 A1 * | 8/2008 | Huta | 454/4 |
| 2009/0023377 A1 * | 1/2009 | Duke et al. | 454/250 |
| 2009/0088060 A1 * | 4/2009 | Arnold et al. | 454/4 |
| 2010/0015908 A1 * | 1/2010 | Prevost | 454/289 |
| 2011/0275307 A1 * | 11/2011 | McIver | 454/367 |

* cited by examiner

FROST-FREE VENT ASSEMBLY

CROSS REFERENCE TO RELATED APPLICATIONS

Not Applicable.

STATEMENT REGARDING FEDERALLY SPONSORED RESEARCH AND DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

This invention relates to vent assemblies and improvements thereof to prevent accumulation of frost, snow, or debris around and within vent assemblies.

A vent assembly is useful to prevent the buildup of gases or cold temperatures in water, waste water, or other system(s) where breathable airflow is required. Vent assemblies are used in pipe assemblies, households, water heaters, water systems, underground sewage systems, septic tanks, and more. The invention herein refers to vent assemblies where breathable airflow is necessary, but the same idea and invention claimed presently can be used for any vent assembly system.

Most underground vent assemblies in the prior art comprise a riser pipe with a mesh screen around the opening fitted perpendicular to a system of pipes. Water and waste water gases that can accumulate within the pipe system are vented via the riser pipe, increasing breathable airflow throughout the pipe system and preventing the possibility of gas buildup. Accumulation of gases also reduces breathable airflow throughout a pipe system and can result in gases exiting through undesirable exit points.

In certain geographic regions, frost accumulates along the lumen and outside of riser pipes during winter months. The mixing of cold air from the outside to the warmer air and precipitation within the pipe lumen increases the possibility that the vent tube will freeze. Frost build-up and freezing within the riser pipe eventually leads to cracking of the pipes and increased maintenance costs for municipalities to prevent additional cracking.

Too much frost accumulation within the lumen of the riser pipe also can inhibit release of built up gases within the pipe system because the moisture trapped within the lumen of the pipe assembly freezes solid. As the trapped moisture freezes within the riser pipe, less gas is able to vent through the assembly. Eventually, little to no gas escapes the riser pipe because the lumen is frozen through completely.

It is important to vent harmful gases such as methane, ammonia, carbon monoxide, or hydrogen sulfide because accumulation of the gases in a confined space could be noxious to humans. Potential effects of prolonged exposure to hydrogen sulfide or ammonia include irritation of the respiratory tract and the eyes. Exposure to an extremely high concentration of hydrogen sulfide or ammonia can even be fatal.

Methane and carbon monoxide are both odorless colorless gases that are also fatal to humans in high enough concentrations. Methane can displace oxygen in closed facilities resulting in a potential asphyxiation risk when breathed by humans.

Carbon monoxide also displaces oxygen when inhaled resulting in accumulation in the bloodstream and negative health effects. The frost-free vent assembly helps reduce the accumulation of these gases in enclosed environments.

Another risk of accumulating methane or carbon monoxide, in addition to health harms, is the potential combustion risk. Poorly ventilated structures with higher blends of oxygen and methane increase the explosion risk of the structure. Riser pipes and vent assemblies in the prior art do not address the issues mentioned above.

DISCUSSION OF RELATED ART

U.S. Pat. No. 2,629,456 to Dick discloses a cap that fits around the upper end of a riser pipe in a sewage system. The cap comprises no moving parts, and the upper end of the cap has a series of vents. The object of the vent cap to Dick is to prevent accumulation of certain gases and improve airflow throughout a sewage system. The cap disclosed by Dick, however, is limiting because it can only be secured to the upper end of the riser pipe permanently and fails to prevent the buildup of frost along the riser pipe during winter months.

U.S. Pat. No. 4,442,643 to Stadheim discloses a pipe fitting insulation sleeve to prevent frost build-up and prevent winter damage to vent assembly pipes. The insulation sleeve, having a larger radius, fits concentrically around a designated pipe and is sized to prevent the accumulation of frost. Having the sleeve on a pipe prevents the riser pipe from freezing from the inside and possibly cracking. The sleeve disclosed by Stadheim does not improve ventilation of breathable air into a pipe system in the event of substantial frost accumulation.

U.S. Pat. No. 5,595,030 to Pulseher discloses a vent assembly that reduces frost buildup by four wind-powered vanes that scrape off frost that has accumulated on the assembly. Users can detect when too much frost has accumulated because the vanes will fail to rotate. The invention to Pulseher, however, only removes small accumulations of frost and is ineffective at removing and preventing larger buildups of frost. Moreover, the vent assembly to Pulseher is conspicuous in design and requires substantial maintenance, which reduces its utility as an apparatus to remove frost accumulation.

U.S. Pat. No. 5,979,505 to Dreschel discloses a sewer vent deicer. Dreschel discloses a simple to assemble vent assembly that reduces frost accumulation within the pipe with no moving parts. The invention to Dreschel comprises a deicer for sewer vent assemblies that increase the airflow of warm sewer gases through the sewer vent pipe. By increasing the flow of warm sewer gases throughout the sewer vent pipe, the likelihood of freezing decreases. However, the system disclosed by Dreschel is not adjustable and does not prevent animals and insects from entering the assembly.

Salazar discloses a rotatable air vent in U.S. Pat. No. 6,464,579. The object of the invention disclosed by Salazar is to provide a completely rotatable air vent so that air can sufficiently flow in an intended path. The invention disclosed by Salazar comprises a rotatable vent that allows for 360 degrees of free rotation. The free rotation at the top of the riser pipe allows the user to position airflow in an intended direction. Although the freely rotatable vent does allow the user to control the direction of airflow, the vent does not prevent accumulation of frost during winter months.

Willson discloses a vent stack screen in U.S. Pat. No. 6,735,790 designed to fit around a pipe to improve ventilation and airflow. The invention fits concentrically over a riser pipe, the stack screen being slightly larger in diameter than the upper part of the riser pipe so that it fits around the riser pipe. The vent stack screen disclosed by Willson is affixed to the top of the riser pipe, effectively prohibiting insects and other animals from entering the pipe. The stack screen to Willson, however, does not allow airflow to be adjusted, nor does it address or reduce the buildup of frost during winter months.

The frost-free vent assembly invention disclosed herein substantially departs from the designs and conventions of the prior art. The invention provides an adjustable and replaceable apparatus to prevent accumulation of frost within vent pipes during winter months. Vent assemblies in the prior art are not intended to be easily replaceable or adjustable by others. The prior art fails to disclose an adjustable apparatus or means to reduce accumulation of frost within vent pipes during winter months and at the same time prevent access by insects or animals.

Therefore, there is a need for an adjustable frost-free vent assembly that reduces frost accumulation within vent pipes while at the same time preventing insects and animals from accessing the vent pipes. The present invention accomplishes these objectives.

BRIEF SUMMARY OF THE INVENTION

A primary object of the present invention is to provide a vent assembly apparatus that improves functionality over the devices in the prior art.

Another object of the present invention is to provide a vent assembly apparatus that prevents frost accumulation within the lumen of the riser pipe during winter months without electricity that can also be adjusted to increase or decrease airflow as needed.

A further object of the present invention is to provide a vent assembly apparatus that can prevent insects and animals from accessing the lumen of the riser pipe.

An additional object of the present invention is to reduce the time needed to prepare vent assemblies to prevent the riser pipe from freezing during winter months.

Another object of the present invention is to provide a frost-free vent assembly that is compatible with pre-existing riser pipes and is inconspicuous when added to a pre-existing riser pipe.

Further objects of the present invention will become clear as the description continues herein.

BRIEF DESCRIPTION OF THE SEVERAL VIEWS OF THE DRAWINGS

Various other elements, features, and benefits of the present invention can be more fully appreciated as the same becomes better understood when considered in addition to the accompanying drawings, in which like reference characters designate the same or similar components throughout several views, and wherein the functions of the invention become more apparent.

DETAILED DESCRIPTION OF THE INVENTION

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

To overcome the problems with vent assemblies in the prior art, the applicant has invented a novel apparatus to adjust airflow coming through a riser pipe to prevent the accumulation of frost along the lumen of the pipe during winter months. As a result, less time and resources will have to be spent protecting underground pipe systems during winter months. Because the present invention prevents cracking of frozen pipes, costs to replace cracked pipes as a result of a freeze can be reduced.

The invention disclosed herein is a rotatable vent assembly apparatus comprising a vent control component that fits concentrically within the distal end of a riser pipe. The distal end of the riser pipe has a threaded neck designed to receive and fasten to the top of the vent control component also having a threaded neck design. The proximal end of the riser pipe has an annular flange with a plurality of holes to receive bolts to fasten the pipe to the ground or connect the riser pipe to a system. When assembled, the vent assembly can regulate airflow from the riser pipe by rotating the vent control component clockwise or counter-clockwise.

The vent assembly can be constructed of any different number of plastics or other solid materials. Some materials contemplated for the present invention include high-density polyethylene (HDPE), acrylonitrile-butadiene styrene (ABS) plastic, or other high-quality plastics also treated to be both resistant to UVA and UVB light. Lightweight plastics are particularly useful for this invention because they are less likely than metals to corrode over time due to environmental influences such as exposure to moisture and light.

Vent Control Component

Airflow through the vent assembly can be increased or decreased by rotating the vent control component clockwise or counter-clockwise along the threaded neck around the upper part of the riser pipe. The vent control component includes a plurality of vertically oriented equidistant grooves along the outer cylindrical surface. The grooves serve as channels for airflow, which allow air to vent upward and outside the apparatus when placed in an open configuration. Rotation of the vent control component regulates the level of airflow from the vent assembly to the outside via the riser pipe.

To increase airflow, the vent control component can be rotated counter-clockwise by a user so that the equidistant openings on the vent assembly partially or completely overlap the equidistant openings along on the upper portion of the riser pipe creating an open position. When the vent control component is rotated into the open position, the arrangement of the grooves allows air from the pipe system to more freely flow upward and out of the vent assembly. Warm moist air can more easily vent from the riser pipe when the vent control component is rotated into the open position, and air from the riser pipe can be restricted when the vent control component is rotated into the closed position.

When placing the vent assembly into the open configuration, the rotation of the vent control component within the riser pipe will create a tactile sensation to the user because the open configuration will "lock" a plurality of equidistant narrow vertical bumps on the outer cylindrical plane of the vent control component into similarly arranged equidistant narrow vertical grooves located on the inside cylinder of the riser pipe. The feedback sensation will indicate to the user that the assembly is in the open configuration. The equidistant narrow vertical bumps along the outside plane of the vent control component are small enough that they do not impede rotation of the assembly, but the bumps are large enough to fit into the grooves along the inside of the riser pipe cylinder and create the "locked" feedback.

In a closed configuration, the vent control component reduces airflow from the riser pipe. To reduce airflow from the vent assembly, the vent control component can be rotated clockwise so that the grooves along the outside of the cylindrical surface do not create an open path for upward airflow. When placed in the closed configuration, the grooves along the outer cylinder of the vent control component do not overlap the air vanes along the upper position of the riser pipe, thus limiting upward airflow out of the riser pipe.

In the preferred embodiment of the present invention, the vent control component includes a conical top designed to reduce accumulation of precipitation or snow along the top of the vent assembly. For environments where precipitation and snow accumulation are less problematic, it is also contemplated that a flat cylindrical top could also be used as a possible cap for the vent control component.

In one embodiment, the conical top of the vent control component would include a locking or securing mechanism to receive a key or securing mechanism so that the vent control component could be maintained in a specific configuration. Use of a key and lock or securing mechanism would also prevent unwanted individuals from tampering with the configuration of the vent assembly.

Riser Pipe

The riser pipe of the present invention acts as a bridge between the vent assembly and the actual pipe system. The proximal end of the riser pipe connects directly to the pipe system and is arranged perpendicular to the pipe system. At the proximal end of the riser pipe is a flange having a plurality of openings to receive a bolt. The flange can connect to a pipe system or the proximal end of the riser pipe can be placed over an already existing pipe system and then connected to a surface via the openings. In another embodiment of the present invention, the proximal end of the riser pipe includes a threaded neck designed to attach to an already existing pipe system.

The distal end of the riser pipe surface also has a plurality of vertically arranged equidistant openings along the outside of the cylindrical surface to permit airflow when placed in the open configuration. The openings further include a plurality of horizontally arranged rectangular equidistant air vanes to direct airflow and to prevent small animals and insects from entering the vent assembly. In one embodiment of the present invention, the distal end of the riser pipe cylinder is open and secures to fasten the vent control component to the riser pipe via a threaded neck.

Within the distal end of the inner cylinder surface of the riser pipe a continuous groove is circumferentially placed where the distal end of the vent control component would meet the riser pipe when secured in a rotatable position. The continuous groove helps provide the user feedback that the vent control component is in place and allows the vent control component to be more easily rotated within the riser pipe. The vent control component may be removable from the riser pipe to replace or fit a different mesh component between the riser pipe openings and the vent control component.

In another embodiment of the present invention, the riser pipe and the vent control component are combined as a single apparatus. The vent control component is directly attached to the riser pipe and rotates clock-wise or counter-clockwise along a circular axis.

It is contemplated that the riser pipe component be manufactured from high-density polyethylene (HDPE), poly-vinyl chloride, acrylonitrile-butadiene styrene (ABS) plastic, or other high-quality plastics also treated to be both resistant to UVA and UVB light.

To ensure that birds, small mammals, insects, and other living creatures are unable to enter the riser pipe, the preferred embodiment of the invention includes a mesh component that fits between the inner cylinder of the riser pipe and vent control component that prevents small living creatures from entering the riser pipe through the openings and air vanes. The mesh will be cylindrically formed without a top and a bottom and placed along the inside cylinder of the distal end of the riser pipe against the openings. To effectively prevent small living creatures from entering the riser pipe through the openings and air vanes, it is contemplated that the opening spacing of the mesh be within a range between 2500 to 25000 microns. It is foreseen that the mesh component be replaceable over time or as needed by a user after normal use.

Figure 1:
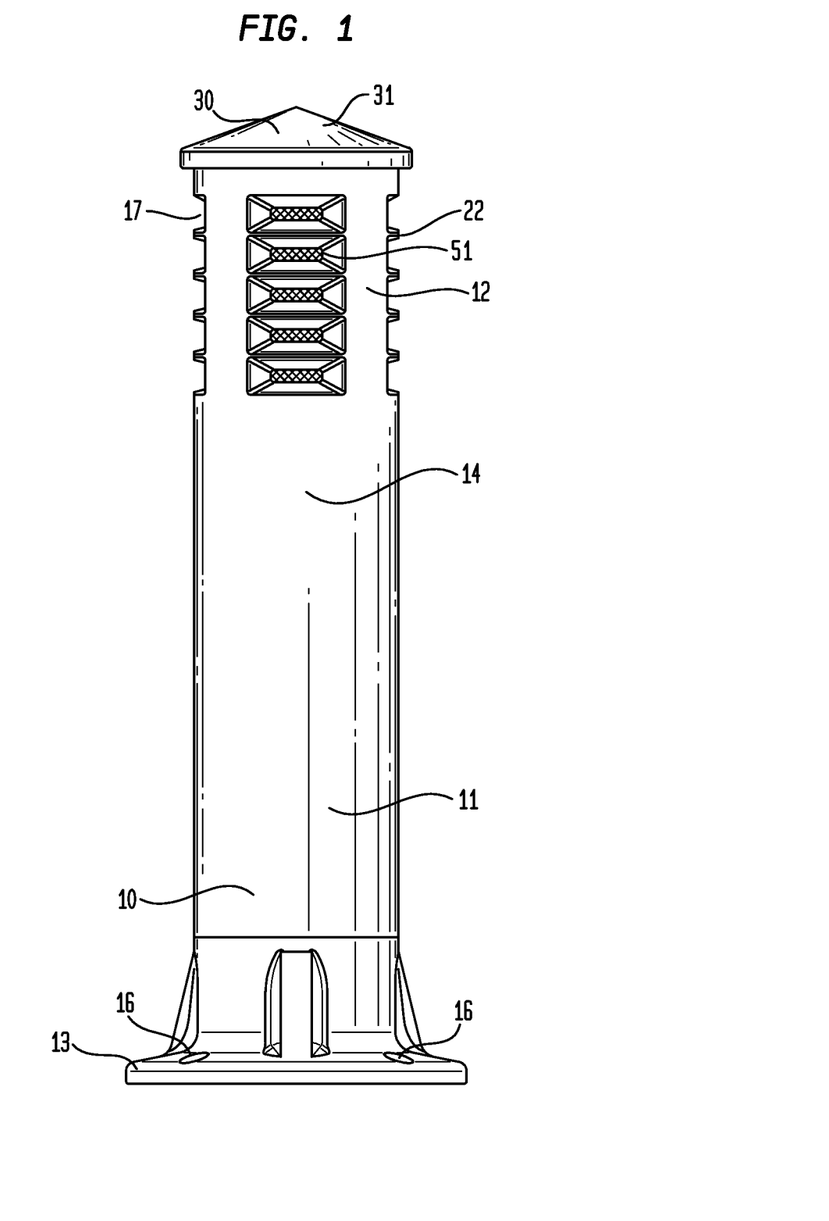
FIG. 1 is a side view of the frost-free vent assembly with the vent control component.

FIG. 1 is a side view of the frost-free vent assembly. The outer surface of the riser pipe (14) is shown with the proximal end of the riser pipe (10) having attachments (16) to receive one or more bolts to fasten the riser pipe (10) to a system. The proximal end of the riser pipe (11) can be fastened to a pipe system via a flange component (13). At the distal end of the riser pipe (12), a plurality of equidistant openings (17) along the outer surface of the riser pipe (14) and horizontally arranged air vanes (22) within the openings is shown with a mesh component (51) placed between the vent control component (30) and the air vanes (22). At the top of the distal end of the riser pipe (12) is the vent control component cap (31), which can be rotated clockwise or counter-clockwise to increase or decrease airflow through the vent assembly.

Figure 2:
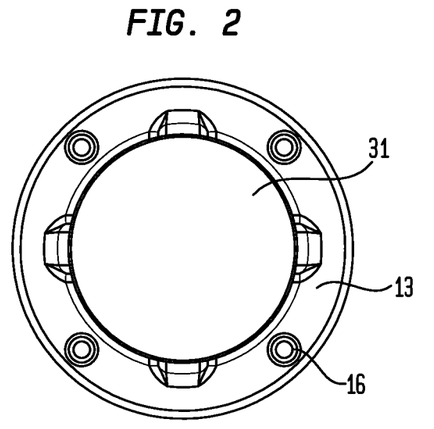
FIG. 2 is a top-down view of the frost-free vent assembly with the vent control component.

FIG. 2 is a top down view of the frost-free vent assembly. Shown in the center of the Figure is the vent control component cap (31) concentrically within the larger flange component (13) at the proximal end of the riser pipe (11). Outside the vent control component (31) of the top-down view are the attachments to receive one or more bolts (16) and the flange component (13).

Figure 3:
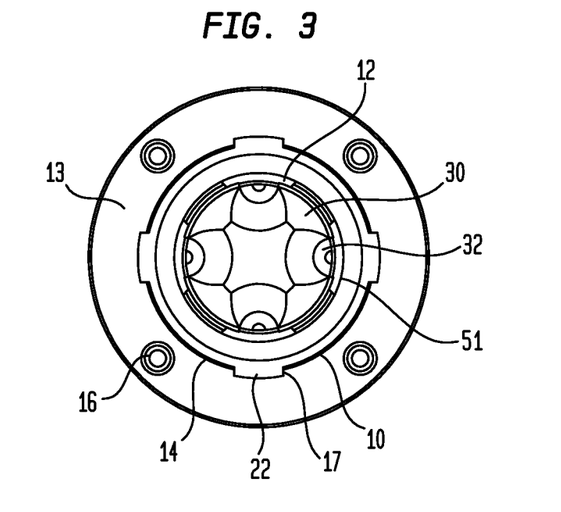
FIG. 3 is a bottom-up view of the frost-free vent assembly with the vent control component.

FIG. 3 is a view from the bottom-up of the interior of the frost-free vent assembly. Shown at the center ring of FIG. 3 is the vent control component (30), which can rotate clockwise or counter-clockwise within the riser pipe (10). The plurality of grooves (32) along the outer surface of the vent control component (30) is shown as part of the innermost ring. The next annular layer outward from the innermost ring is the mesh component (51), which is placed between the vent control component (30) and the air vanes (22) along the distal end of the riser pipe (12) within the riser pipe (10) itself.

The third annular layer outward from the innermost ring is the actual riser pipe (10), which is shown in the Figure as having a plurality of equidistant openings (17) along the outer surface of the riser pipe (14) and a plurality of horizontally arranged air vanes (22). Shown further outward from the innermost ring are the attachments for the proximal end of the riser pipe (11) to receive one or more bolts (16) and attach to a pipe system via the flange component (13). Because the proximal end of the riser pipe (11) comprises the flange component (13) to attach the apparatus to a pipe system and a section to receive bolts (16), this component is larger in circumference than the riser pipe (10).

Figure 4:
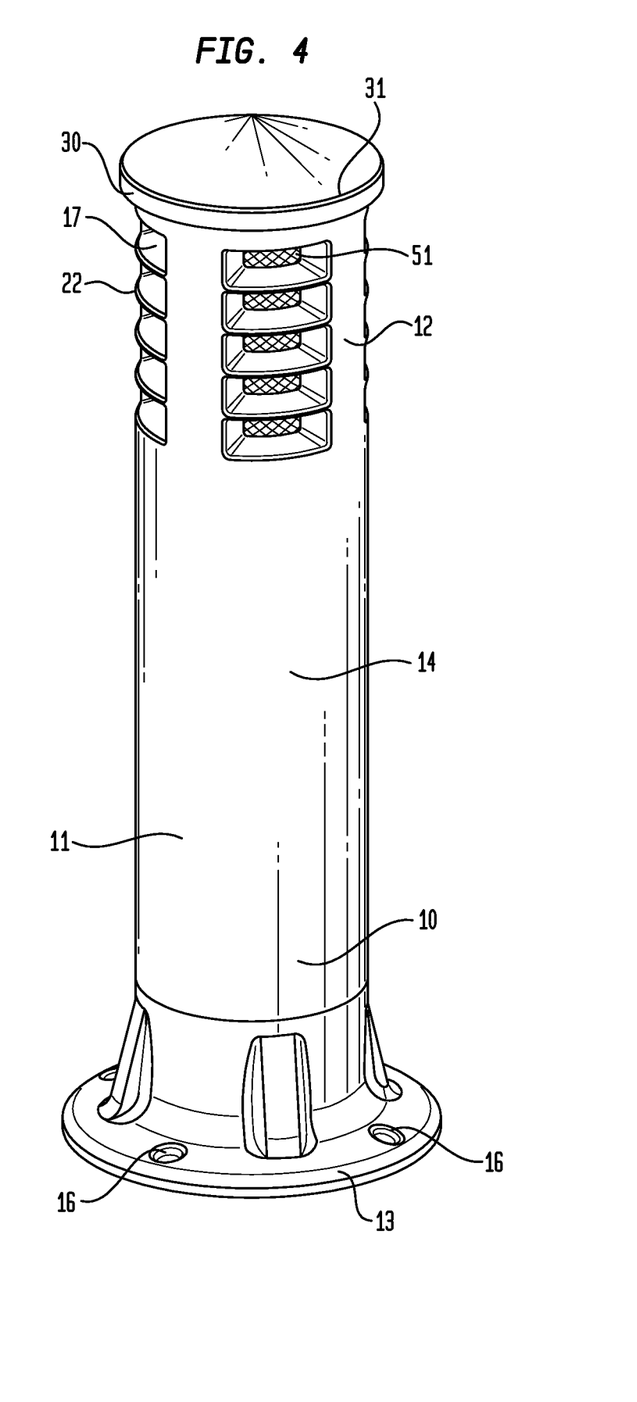
FIG. 4 is an isometric view of the frost-free vent assembly with the vent control component.

FIG. 4 is an angled view of the exterior of the frost-free vent assembly. The outer surface of the riser pipe (14) is shown with the proximal end of the riser pipe (11) having attachments to receive one or more bolts (16) to fasten the riser pipe (10) to a system. Similar to FIG. 1, the proximal end of the riser pipe (11) shown here can also be fastened of equidistant openings (17) along the outer surface of the riser pipe (14) and horizontally arranged air vanes (22) within the openings is shown with a mesh component (51) placed between the vent control component (30) and the air vanes (22). At the top of the distal end of the riser pipe (12) is the vent control component cap (31), which can be rotated clockwise or counter-clockwise to increase or decrease airflow through the vent assembly.

Figure 5:
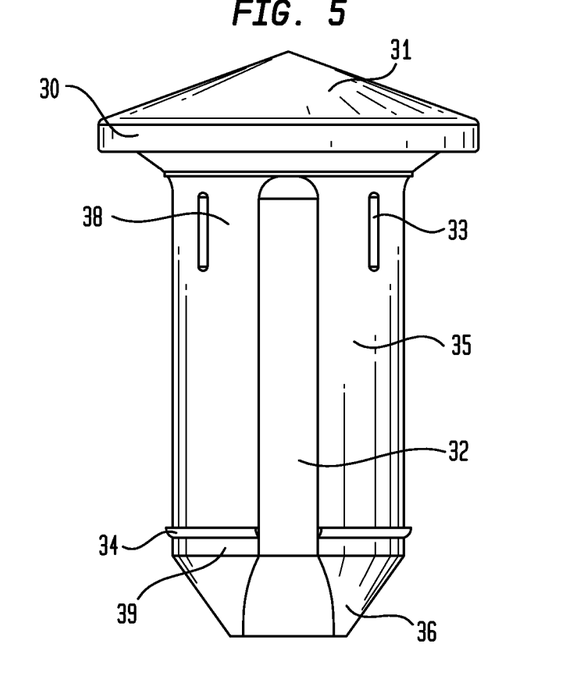
FIG. 5 is a side view of the vent control component.

FIG. 5 is a side view of the vent control component. The vent control component (30) has longitudinal axis L2 with an outer cylindrical surface (35) connecting distal (39) and proximal (38) ends. At the proximal end (38) of the vent control component (30) is the vent control component cap (31), which allows the vent control component to be rotated clockwise or counter-clockwise. Parallel to the longitudinal axis L2 along the outer cylindrical surface (35) of the vent control component (30) is a plurality of equidistant grooves (32) that begin at the proximal end (38) of the vent control component (30) and end along the distal end (39).

Also parallel to the longitudinal axis L2 along the outer cylindrical surface (35) of the vent control component (30) is a plurality of narrow vertical bumps (33). The narrow vertical bumps (33) begin at the proximal end (38) of the vent control component (30) and end before reaching the equatorial point of longitudinal axis L2. Along the outer cylindrical surface (35) of the vent control component (30) each vertical bump (33) is parallel and adjacent to one or more equidistant grooves (32) to the left and right of the vertical bump (33). Additionally, each equidstant groove (32) along the outer cylindrical surface (35) of the vent control component (30) is parallel and adjacent to a vertical bump (33) on the left and right of the groove.

The distal end (39) of the vent control component (30) is designed so that the equidistant grooves (32) along the outer cylindrical surface (35) converge to form an inward curvature toward the center distal end of the vent control component (30). The resulting shape of the distal end (39) of the vent control component (36) resembles an inverted plateau with concave sides. The shape of the distal end (39) of the vent control component (36) is more apparent in FIG. 6 than the view of the invention in FIG. 5.

Moreover, a plurality of continuous narrow annular protrusions (34) along the distal end (39) of the outer cylindrical surface (35) of the vent control component (30) help to align the vent control component (30) along the proper rotational axis with the riser pipe (10). The narrow annular protrusions (34) along the outer cylindrical surface (35) of the vent control component (30) are perpendicular to the vertical bumps (33), grooves (32), and longitudinal axis L2. Each narrow annular protrusion (34) along the outer cylindrical surface (35) of the vent control component distal end (39) ends where each equidistant groove (32) is formed out of the outer cylindrical surface (35), and begins where each equidistant groove (32) ends.

Figure 6:
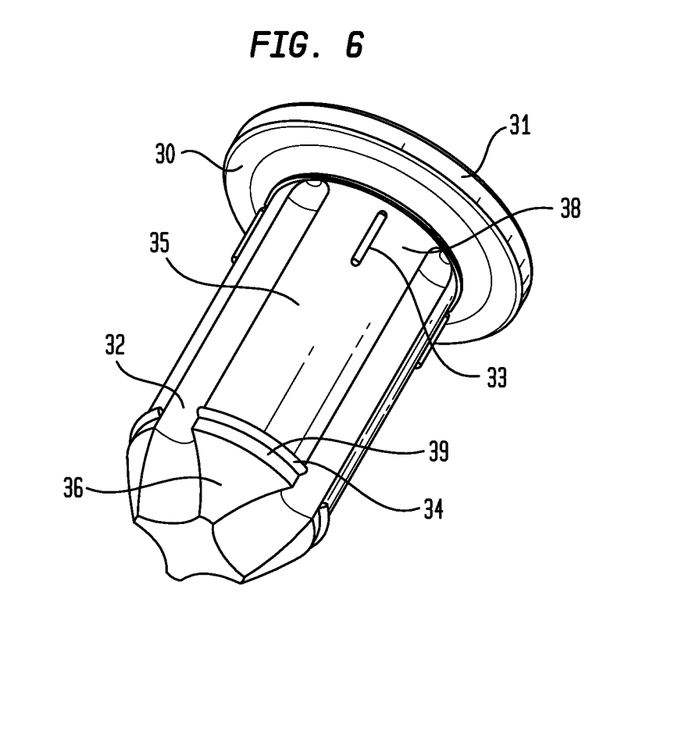
FIG. 6 is an isometric view of the vent control component.

FIG. 6 is an isometric view of the vent control component. The vent control component (30) in FIG. 6 is shown with the distal (39) end shown on the left half of the drawing, and the proximal (38) end on the right half of the Figure. At the proximal end (38) of the vent control component (30) is the rotatable vent control component cap (31), which allows the vent control component (30) to be rotated along an axis concentric to the riser pipe (10). Along the outer cylindrical surface (35) of the vent control component (30) is a plurality of equidistant grooves (32) that begin at the proximal end (38) of the vent control component (30) and end along the distal end (39).

Another component along the outer cylindrical surface (35) of the vent control component (30) is a plurality of narrow vertical bumps (33). The narrow vertical bumps (33) begin at the proximal end of the vent control component (30) outer cylindrical surface (35) and are less than twelve centimeters in length. Additionally, each vertical bump (33) along the outer cylindrical surface (35) is parallel and adjacent to a plurality of equidistant grooves (32) to the left and right of each vertical bump (33). Similarly, each equidistant groove (32) along the outer cylindrical surface (35) of the vent control component (30) is parallel and adjacent to a vertical bump (33) on the left and right of the groove.

The distal end (39) of the vent control component (30) is designed so that the equidistant grooves (32) along the outer cylindrical surface (35) converge to form an inward curvature toward the center distal end of the vent control component (30). The resulting shape of the distal end of the vent control component (36) resembles an inverted plateau with concave sides as shown in detail in the Figure. Moreover, the plurality of continuous narrow annular protrusions (34) along the distal end (39) of the outer cylindrical surface (35) of the vent control component (30) help to align the vent control component (30) so that it rotates on a concentric axis to the riser pipe (10). The narrow annular protrusions (34) along the outer cylindrical surface (35) of the vent control component (30) are perpendicular in orientation to the neighboring vertical bumps (33) and equidistant grooves (32).

While a particular form of the invention has been illustrated and described, it will be apparent that various modifications can be made without departing from the spirit and scope of the invention. For example, various shaft-attaching mechanisms other than threaded shafts and apertures may be utilized, without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A frost-free vent assembly apparatus for pipe systems comprising:
   a riser pipe having a longitudinal axis with distal and proximal ends, the proximal end comprising a flange configured to secure the riser pipe to a pipe or surface, the distal end of the inner cylindrical surface of the riser pipe having a plurality of radially arranged vertical grooves parallel to the longitudinal axis and designed to receive one or more ridges, the distal end of the riser pipe comprising a plurality of equidistant radially arranged openings along the riser pipe cylindrical surface, the equidistant openings having a plurality of equidistant air vanes horizontally and perpendicularly arranged to the longitudinal axis;
   a rotatable vent control component having a longitudinal axis with distal and proximal ends, the proximal end configured to secure the vent control component concentrically within the riser pipe, the outer cylindrical surface of the vent control component comprising:
   a plurality of radially arranged vertical grooves and a plurality of radially arranged vertical ridges designed to fit within the radially arranged vertical grooves of the distal end of the inner cylindrical surface of the riser pipe, wherein the plurality of radially arranged vertical grooves of the outer cylindrical surface of the vent control component converge inward toward the longitudinal axis of the vent control component at the distal end of the vent control component; and
   an annular protrusion extending outward from the outer cylindrical surface of the vent control component and configured to create a gap between the outer cylindrical surface of the vent control component and the riser pipe such that air flow is still permitted when the plurality of radially arranged grooves of the vent control component is not aligned with the radially arranged openings of the riser pipe; and
   a mesh component located between the rotatable vent control component and the inside of the riser pipe.

2. The vent assembly of claim 1, wherein the components are formed from the group consisting of high-density polyethylene, polyvinyl-chloride, acrylo-nitrile-butadiene-styrene, and combinations thereof.

3. The vent assembly of claim 1, wherein the opening spacing of the mesh component is within a range of 2500 to 25000 microns.

4. The vent assembly of claim 1, wherein the proximal end of the rotatable vent control component comprises a flat circular surface.

5. The vent assembly of claim 1, wherein the riser pipe further comprises one or more openings for a key.

6. The vent assembly of claim 1, wherein the surface of the vent control component further comprises a lock.

7. The vent assembly of claim 1, wherein the distal end of the riser pipe and the proximal end of the vent control component are configured to threadably couple to one another.

8. A frost-free vent assembly for pipe systems comprising:
   a riser pipe comprising:
      a proximal end comprising a flange configured to secure the riser pipe to a pipe or surface; and
      a distal end comprising a plurality of radially arranged vertical grooves on an inner surface of the riser pipe running parallel to a longitudinal axis of the riser pipe and configured to receive one or more ridges, the distal end of the riser pipe further comprising a plurality of radially arranged openings along the riser pipe cylindrical surface;
   a rotatable vent control component comprising:
      a plurality of radially arranged vertical grooves on an outer cylindrical surface of the vent control component and running parallel to a longitudinal axis of the vent control component, the plurality of radially arranged vertical grooves in fluid communication with an interior of the riser pipe and converging inward toward the longitudinal axis of the vent control component at a distal end of the vent control component;
      a plurality of radially arranged vertical ridges designed to fit within the radially arranged vertical grooves of the distal end of the inner surface of the riser pipe; and
      an annular protrusion extending outward from the outer cylindrical surface of the vent control component and configured to create a gap between the outer cylindrical surface of the vent control component and the riser pipe such that air flow is still permitted when the plurality of radially arranged grooves of the vent control component is not aligned with the radially arranged openings of the riser pipe; and
   a mesh component located between the rotatable vent control component and the inside of the riser pipe, the mesh component extending over at least one of the radially arranged openings of the riser pipe cylindrical surface.

9. The vent assembly of claim 8, wherein the riser pipe further comprises a plurality of air vanes located between the plurality of radially arranged openings.

10. The vent assembly of claim 8, wherein the plurality of radially arranged vertical grooves of the outer cylindrical surface of the vent control component are located at a radially equidistant interval from one another.

11. The vent assembly of claim 8, wherein the plurality of radially arranged vertical ridges of the outer cylindrical surface of the vent control component are located at a radially equidistant interval from one another.

12. The vent assembly of claim 8, wherein one or more components comprise at least one of a high-density polyethylene, a polyvinyl-chloride, and an acrylo-nitrile-butadiene-styrene.

13. The vent assembly of claim 8, wherein the mesh component has an opening spacing is within a range of 2500 to 25000 microns.

14. The vent assembly of claim 8, wherein the distal end of the riser pipe and a proximal end of the vent control component are configured to threadably couple to one another.

15. The vent assembly of claim 8, wherein a proximal end of the vent control component comprises a substantially conical cap.

16. The vent assembly of claim 8, wherein the vent control component further comprises a lock or key-receiving securing mechanism.

17. The vent assembly of claim 8, wherein the proximal end of the riser pipe is configured to threadably couple to an external pipe.

18. The vent assembly of claim 8, wherein the mesh component is substantially cylindrical.

* * * * *